United States Patent [19]

Abel et al.

[11] 4,060,006
[45] Nov. 29, 1977

[54] DEVICE FOR AND METHOD OF AFFIXING THE ENDS OF A SUBSTANTIALLY PLASTIC LADDER CHAIN TO MAKE A CONTINUOUS LADDER CHAIN THEREOF

[75] Inventors: Stephen Carl Abel; Jeffrey Allen Carlson, both of Longmont, Colo.

[73] Assignee: International Business Machines Corporation, Armonk, N.Y.

[21] Appl. No.: 724,794

[22] Filed: Sept. 20, 1976

[51] Int. Cl.² .............................................. F16G 13/02
[52] U.S. Cl. .................. 74/258; 74/245 LP; 74/250 R
[58] Field of Search ................ 74/258, 245 LP, 250 R

[56] References Cited
U.S. PATENT DOCUMENTS

| | | | |
|---|---|---|---|
| 112,053 | 12/1914 | Terry | 74/258 |
| 3,939,721 | 2/1976 | Kuchzig et al. | 74/258 |

*Primary Examiner*—Leonard H. Gerin
*Attorney, Agent, or Firm*—John G. Wynn

[57] ABSTRACT

A substantially plastic ladder chain is made continuous by affixing the exposed metallic cable ends thereof to a master coupling link of stainless steel or like material. The exposed metallic cable ends of the plastic ladder chain comprising plural braided cable also of stainless steel or like material are fastened in such a way to separate master cross links, of the aforementioned master coupling link, by master link side lock pins of brass or like material so as to form substantially a molecular bond. The master cross links are then connected together in a conventional manner by master link retainer clamps and master link retainer clips, thus forming the continuous ladder chain.

28 Claims, 5 Drawing Figures

DEVICE FOR AND METHOD OF AFFIXING THE ENDS OF A SUBSTANTIALLY PLASTIC LADDER CHAIN TO MAKE A CONTINUOUS LADDER CHAIN THEREOF

BACKGROUND OF THE INVENTION

1. Field of the Invention

The invention relates, generally, to collator driven ladder chains for use in copiers/duplicators, and more particularly, to a device for and a method of fastening the exposed cable ends of a substantially plastic ladder chain to make a continuous chain thereof.

2. Description of the Prior Art

Heretofore, various techniques for coupling the exposed cable ends of plastic collator driven ladder chains have been employed in the art. These techniques include tungsten inert gas (TIG) and electron beam (E-beam) welding, epoxy bonding and lock collar swedging. Notwithstanding desirable features of each of the foregoing techniques, major problems exist which have been difficult to overcome up to the present time.

For example, metallographic examination of previous TIG and E-beam welded plastic ladder chains, i.e., examination of the interface between the plural steel cables therein and the master cross links, revealed extensive recrystallization, grain growth and networks of carbide precipitates along grain boundaries in a significant zone adjacent to the weld bead. This large heat affected zone (HAZ) was attributable, mainly, to excessive welding times. It was found that the HAZ extended along the steel cable from the weld bead, a distance comparable to the diameter of the cable used, e.g., 0.30 inch. Hence, efforts to minimize welding times by increasing welding currents were employed.

Although metallographic examination, after the foregoing modification, revealed a slight decrease in HAZ lengths, no significant reductions in recrystallization, grain growth, or the degree of carbide precipitation within the HAZ was found. In addition, after static and dynamic force testing, examination of failure fracture surfaces by scanning electron microscopy revealed predominantly brittle and fatigue fractures in many wires of the cable. Moreover, the many surfaces, i.e., between the weld bead, the cable and the master cross link, contained fractured or cracked wires along the outer edges of the cable that were indicative of advanced fatigue. It also was found that brittle and fatigue failures were enhanced by the decomposition of the cable lubricant and remnants of the plastic jacket during the welding process, supplying thereby, an abundant supply of carbon atoms which increased carbide precipitation.

Since careful control and optimization of the primary welding parameters is necessary, as the foregoing indicates when using TIG or E-beam welding, these techniques are deemed unsatisfactory for affixing the exposed cable ends of a plastic ladder chain to make a continuous chain. Although care in manufacturing such a proper cleaning procedures to remove both the lubricant and plastic remnants from the cable prior to welding, will provide additional life time of the connected cable under static pullout tests and dynamic driving force tests, there is a need in the art to eliminate the necessity for sophisticated control and optimization procedures and additional cleaning procedures to fabricate continuous plastic ladder chains having long term life.

As brittle and fatigue failures are characteristic of the foregoing welding techniques, failure due to the cable pullout is characteristic of the well known epoxy bonding technique. In this technique, the failure mechanism was found to be shearing at the epoxy-cable interface. Typical static pullout loads between 25 and 75 pounds and dynamic driving force loads of 3 in-lbs were used in testing this technique as well as the foregoing welding techniques. It was found that each technique withstood, quite well, the static pullout test but failed the more demanding dynamic driving force test after less than 36 hours of continuous loading.

An additional problem encountered with the epoxy bonding technique was the difficulty in restricting the flow of the epoxy prior to setting while still maintaining the proper pitch, i.e., the position of the steel cable in relationship to the master cross link. Thus, there is a need in the prior art to eliminate cable pullout failures due to static and dynamic loading, while maintaining simple manufacturing procedures for affixing the exposed cable ends of a substantially plastic ladder chain together to make a continuous ladder chain thereof.

Another technique used in the prior art, termed the swedge lock collar technique, involves the formation of a conical volume of material which fits around the cable snugly inside a chamfer in the master cross link. As loading is applied to the cable, the aforementioned collar is compressed, thereby applying a uniform compression force on the cable. Although this technique, in operation, appeared to withstand the static and dynamic testing forces aforementioned, a number of difficulties were encountered. These difficulties included slow and tedious assembly, non-uniform cone formations around the cable, separation of the outer wires of the cable during forming of the cone and the inability to consistently form cones with proper tolerances between cross link members.

Consequently, there is a need in the art for a method of affixing the exposed metallic cable ends of a substantially plastic ladder chain, used as a driven chain in a collator, to withstand both the static and dynamic forces experienced in actual operation while eliminating slow and tedious manufacture assembly, maintaining uniformity in manufacture assembly and maintaining proper clearance between cross link members.

The prior art, as indicated hereinabove, includes some advances in affixing the exposed ends of substantially plastic ladder chains to make a continuous chain thereof. However, insofar as can be determined, no prior art device or method incorporates all the features and advantages of the instant invention.

OBJECTS OF THE INVENTION

Accordingly, an important object of the present invention is to eliminate sophisticated control, optimization and cleaning procedures to more easily fabricate continuous substantially plastic ladder chains having long term life.

Another important object of the present invention is to eliminate cable pullout failures due to static and dynamic loading while still maintaining simple manufacturing procedures for affixing the exposed cable ends of a substantially plastic ladder chain to a master coupling link to made a continuous ladder chain thereof.

Yet another important object of the present invention is to provide a device for and a method of affixing the exposed cable ends of a substantially plastic ladder chain used as a driven chain in a collator to withstand both the static and dynamic forces experienced therein while eliminating slow and tedious manufacture assembly and to maintaining proper clearance between cross link members of the continuous ladder chain produced.

SUMMARY OF THE INVENTION

In accordance with these and other objects and features of the present invention, a device for and a method of affixing the exposed metallic cable ends of a substantially plastic ladder chain together to make a continuous ladder chain thereof is disclosed.

Briefly, the device of the invention, termed a master coupling link, comprises a pair of master cross links of stainless steel or like material having approximately the configuration of plastic cross link members of the previously mentioned substantially plastic ladder chain, each master cross link having, inter alia, a plurality of cavities disposed therein with two of the cavities, termed cable cavities, spaced symmetrically and perpendicular to the longitudinal dimension thereof and extending therethrough, and at a distance apart equivalent to the distance between the exposed cable ends of the substantially plastic ladder chain for receiving the exposed metallic cable ends, and also side pin cavities disposed in each side end of each master cross link perpendicular to and intersecting the aforementioned cable cavities; a plurality of master link side lock pins of brass or like material for insertion, under force, into the aforementioned side pin cavities for affixing the exposed cable ends to each master cross link; a pair of master link retainer clamps of steel or like material having plural openings therein for clamping and retaining the master cross links in a position corresponding to the position of adjacent cross link members of the substantially plastic ladder chain; and a plurality of master link retainer clips for retaining and securing the master link retainer clamps to the master cross links thus forming the master coupling link, and accordingly, a continuous ladder chain.

Finally, the method of the invention discloses the steps for affixing or locking the exposed metallic cable ends of the substantially plastic ladder chain to each master cross link to make an improved continuous ladder chain that will withstand both the static and dynamic loads characteristic of collator driven ladder chains. The unique step of the method is deflecting, under a measured delfection force, master link side lock pins of brass or like material thereby affixing or locking the exposed metallic cable ends of the aforementioned plastic ladder chain. The locking mechanism is predicated on forcing the master link side lock pins into the side pin cavities of the master cross links against the exposed metallic cable ends, after insertion thereof, such that the ends of the master link side lock pins both close around and partially compress the exposed metallic cable ends against the walls of the cable cavities thereby forming substantially a molecular bond.

In the preferred method of the invention, the diameters of the master side lock pins are slightly larger, but never less, than the diameters of the exposed metallic cable ends, and of a material sufficiently softer than the master cross links or the exposed metallic cable ends to facilitate adequate metal flow under reasonable master link side lock pin deflection forces. Failure to fulfill either of the above criteria will convert the locking mechanism to primarily a compression of the exposed metallic cable ends against the walls of the cable cavities. As a consequence, there will be a decrease of operational life time since the exposed metallic cable ends will be transformed from an agglomeration of partially free wires to essentially a semirigid member. To complete the method of the invention, the master cross links are then connected together by master link retainer clamps and master link retainer clips to form the continuous ladder chain.

BRIEF DESCRIPTION OF THE DRAWINGS

The foregoing and other objects, novel features and advantages of the invention will be more apparent from the following more particular description of the preferred embodiment as illustrated in the accompanying drawings, in which.

DESCRIPTION OF THE PREFERRED EMBODIMENT

Figure 1:
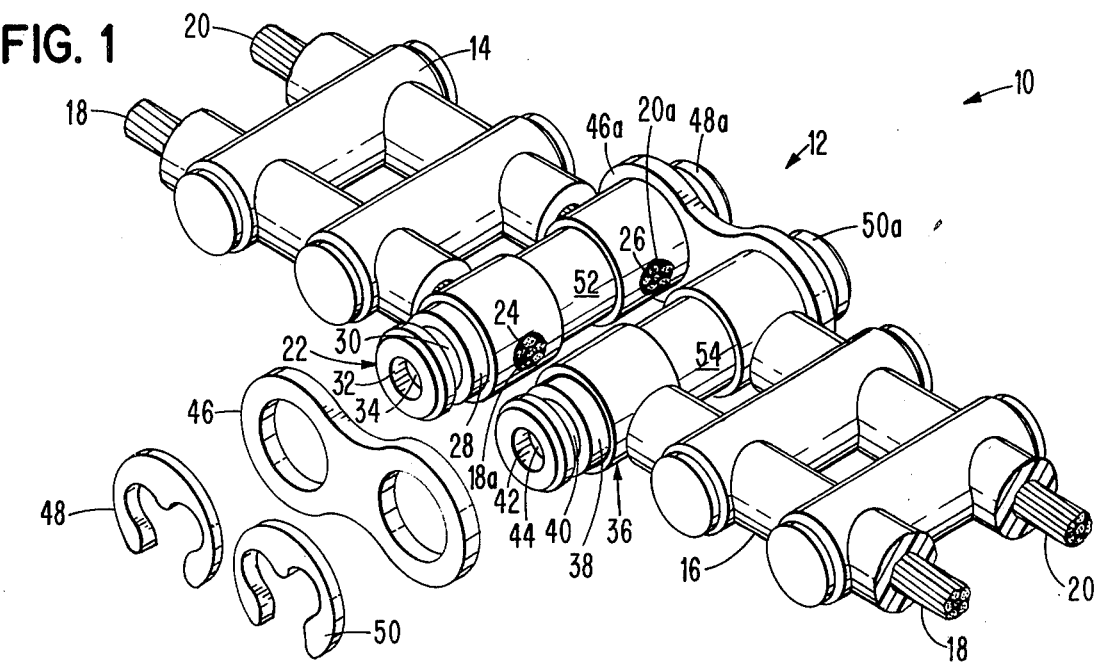
FIG. 1 is a perspective view of the device according to the invention depicting partially the continuous ladder chain made thereby.

FIG. 1 illustrates a continuous substantially plastic ladder chain 10 comprising a master coupling link 12, a plurality of plastic cross link members 14 having a plurality of plastic spacer members 16 integral thereto and plural braided cables 18 and 20 jacketed by the aforementioned plastic cross link members and plastic spacer members.

Exposed metallic cable ends 18a and 20a are affixed to a first master cross link 22, of master coupling link 12, through cable cavities 24 and 26 therein. Also, first master cross link 22 in configured to have a master link retainer clamp shoulder 28, a retainer clip annular groove 30 and a side pin cavity 32 for insertion of master link side lock pin 34. It should be mentioned that the opposite end of first master cross link 22, not totally shown in FIG. 1, is identical in every respect to the foregoing description.

A second master cross link 36, identical to first master cross link 22, is also configured to have a master link retainer clamp shoulder 38, a retainer clip annular groove 40, and a side pin cavity 42 for insertion of master link side lock pin 44. The opposite end of second master cross link 46 is identical in every respect to the foregoing description.

Still referring to FIG. 1, master link retainer clamps 46 and 46a clamp over the aforementioned master link retainer clamp shoulders retaining first and second master cross links 22 and 36 in a position corresponding to the spacing between adjacent plastic cross link members aforementiod. A plurality of master link retainer clips 48, 48a, 50 and 50a are configured to fit into the retainer clip annular grooves to secure and retain the aforementioned master link retainer clamps to master cross links 22 and 36 forming, thereby, a continuous substantially plastic ladder chain 10.

As further shown in FIG. 1, master cross link sprocket mating surfaces 52 and 54, configured in first master cross link 22 and second master cross link 36, respectively, have diameters equivalent to each plastic link member 14 for mating with the particular sprocket to be used.

Figure 2A:
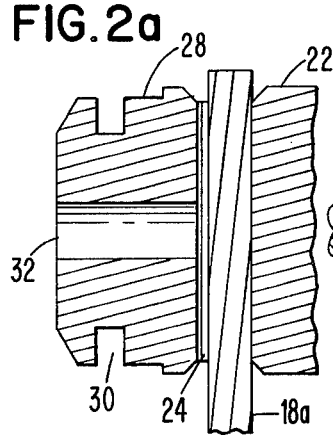
FIGS. 2a–c are partial sectional views showing the method of affixing an exposed metallic cable end to a master cross link according to the invention.
Figure 2B:
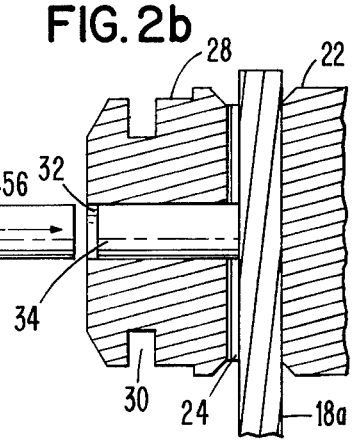
Figure 2C:
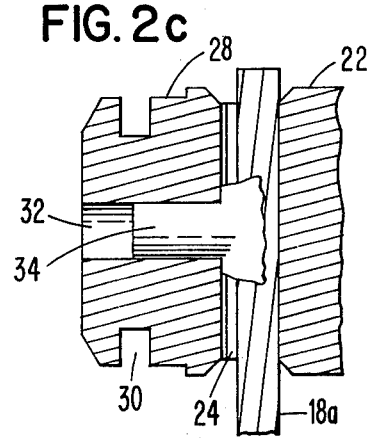

The unique locking mechanism of the invention can best be understood by referring to FIGS. 2a, 2b and 2c concurrently, where the method of the invention is depicted. Thus, exposed metallic cable end 18a is inserted into cable cavity 24 of first master cross link 22. Master link side lock pin 34 is inserted into side pin cavity 32 and deflected against exposed metallic cable end 18a by a lock pin deflection punch 56. A measured deflection force, of lock pin deflection punch 56, is applied to master link side lock pin 34 causing the aforementioned lock pin to deflect and flow around exposed metallic cable end 18a forming substantially a molecular bond.

Figure 3:
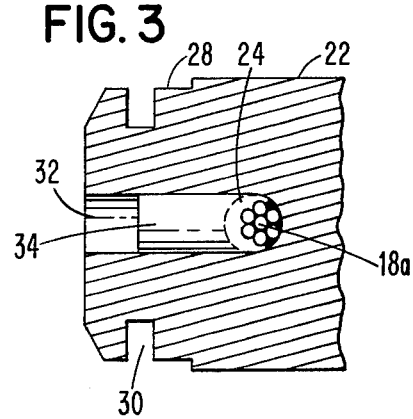
FIG. 3 is another partial sectional view showing the flow of the master link side lock pin around the exposed metallic cable end to form substantially a molecular bond according to the invention.

FIG. 3 depicts in better detail the locking mechanism shown in FIG. 2c. An end view of exposed cable end 18a and master link side lock pin 34 after deflection thereof is illustrated. The deformed end of master link side lock pin 34, as shown, flows uniformly around individual wires of exposed metallic cable end 18a causing partial compression thereof against the wall of cable cavity 24.

STATEMENT OF THE OPERATION

The operation, and accordingly, the method of the invention can be understood by referring to FIGS. 2a thru 2c, and FIG. 3 concurrently. The invention is predicated on the concept that master link side lock pin 34 being softer than exposed cable end 18a or cable cavity 24 will flow, under the measured deflection force, around and down the length of exposed metallic cable end 18a as shown in FIGS. 2c and 3. The choice of material for master link side lock pin 34 is dependent upon both static nd dynamic test force requirements. Thus, useful materials for the master link side lock pins, in the order of preferred use, are leaded brass, aluminum, magnesium and austenitic stainless steel. In addition, the master link side lock pin material should have a high work hardening rate; i.e., a large amount of hardening for a given amount of material flow. This assures that as the material flows, it will become harder and, therefore, more resistant to cable pullout under loading. Also, the material of the master cross links and, accordingly, the cavities therein, namely, the cable cavities and the side pin cavities should be harder, as aforementioned, than the master link side lock pin material. This assures adequate flow of the material around and down the cable with minimal damage thereto (see FIGS. 2c and 3).

For purposes of the invention, satisfactory results under a static test force of greater than 25 lbs. and a dynamic test force of 3 in-lbs. for 300 hours, were attained using master link side lock pins of leaded brass having diameters between 0.030 and 0.036 inch and being annealed to a hardness between $R_B$ 50–55; using master cross links of stainless steel having cable cavities and side pin cavities of 0.037 inch therein and being hardened to between $R_C$55–60; and using cables of stainless steel having diameters of 0.030 inch and the exposed metallic ends thereof having a hardness between $R_B$90–100.

In the method of the invention, the force applied to master link side lock pin 34, depicted in FIG. 2b, by lock pin deflection punch 56 is a measured deflection force of approximately 200 lbs. This force causes master link side pin 34 to deflect approximately 0.020 inch flowing around and down exposed metallic cable end 18a, as shown both in FIG. 2c and FIG. 3, forming, thereby, substantially a molecular bond. Metallographic examination confirmed the foregoing by showing some adhesion of the master side lock pin material to the cable material. It is believed that this adhesion is attributable to the material used, frictional forces and the aforementioned measured deflection force which apparently provide some cold welding.

While the invention has been particularly described with reference to the preferred embodiment thereof, it will be understood by those skilled in the art that various changes in form and detail may be made therein without departing from the spirit and scope of the invention.

What is claimed is:

1. A master coupling link for affixing the exposed metallic cable ends of a substantially plastic ladder chain to make a continuous ladder chain thereof comprising:
   plural master cross links of metal having approximately the configuration of a plastic cross link member of said substantially plastic ladder chain, but each of said plural master cross links having a plurality of cavities disposed therein with two of said plurality of cavities, termed cable cavities, spaced symmetrically and perpendicular to the longitudinal dimension thereof and extending therethrough and at a distance apart equivalent to the distance between said exposed cable ends of said substantially plastic ladder chain for receiving said exposed cable ends, and with two of said plurality of cavities, termed side pin cavities, disposed in the ends of each master cross link perpendicular to and intersecting said cable cavities;
   a plurality of master link side lock pins of a metal softer than either said exposed cable ends or said plural master cross links for insertion, under a measured deflection force, into said side pin cavities for affixing said exposed cable ends to each of said plural master cross links forming, thereby, substantially a molecular bond;
   plural master link retainer clamps having dual openings therein for clamping and retaining the ends of said plural master cross links each in a position corresponding to the position of adjacent plastic cross links of said substantially plastic ladder chain; and
   a plurality of master link retainer clips for clipping said ends of said plural master cross links against said plural master link retainer clamps for the retaining and securing thereof to said plural master cross links thereby forming said master coupling link and making said continuous ladder chain.

2. The master coupling link for affixing the exposed metallic cable ends of a substantially plastic ladder chain to make a continuous ladder chain thereof according to claim 1 whenever said exposed metallic cable ends are stainless steel.

3. The exposed stainless steel cable ends of claim 2 wherein said cable ends are braided.

4. The exposed stainless steel braided cable ends of claim 3 wherein said cable ends have a hardness between $R_B$90–100.

5. The master coupling link for affixing the exposed metallic cable ends of a substantially plastic ladder chain according to claim 1 wherein said plural master cross links of metal are stainless steel.

6. The plural stainless steel master cross links of claim 5 wherein said master cross links are hardened to between $R_C$55–60.

7. The master coupling link for affixing the exposed metallic cable ends of a substantially plastic ladder chain to make a continuous ladder chain thereof according to claim 1 wherein said plurality of master link side lock pins of metal are leaded brass.

8. The plurality of leaded brass master link side lock pins of claim 7 wherein said lock pins are annealed to a hardness between $R_B 50-55$.

9. The plurality of leaded brass master link side lock pins having a hardness between $R_B 50-55$ of claim 8 wherein said measured deflection force thereon to form said substantially molecular bond is approximately 200 lbs.

10. The master coupling link for affixing the exposed metallic cable ends of a substantially plastic ladder chain to make a continuous ladder chain thereof according to claim 1 wherein said plurality of master link side lock pins of metal are selected from the group consisting of leaded brass, aluminum, magnesium and austenitic stainless steel.

11. A method of affixing the exposed metallic cable ends of a substantially plastic ladder chain to make a continuous ladder chain thereof comprising the steps of:
  inserting said exposed metallic cable ends of said substantially plastic ladder chain into cable cavities of plural master cross links of metal having approximately the configuration of a plastic cross link member of said substantially plastic ladder chain, said cable cavities being spaced symmetrically and perpendicular to the longitudinal dimension of said plural master cross links;
  inserting master link side lock pins of a metal softer than either said exposed metallic cable ends or said plural master cross links into side pin cavities disposed in the ends thereof perpendicular to and intersecting said cable cavities against said exposed metallic cable ends;
  deflecting said master link side lock pins, with a measured deflection force, so that the ends thereof flow uniformly around and down the length of said exposed metallic cable ends causing partial compression thereof against the walls of said cable cavities thereby forming substantially a molecular bond;
  clamping said ends of said plural master cross links each in a position corresponding to the position of adjacent plastic cross links of said substantially plastic ladder chain with plural master link retainer clamps, and
  clipping said ends of said plural master cross links against said plural master link retainer clamps for securing thereof to said plural master cross links thereby making said continuous ladder chain.

12. The method of claim 11 wherein said exposed metallic cable ends are stainless steel.

13. The method of claim 12 wherein said exposed stainless steel cable ends are braded.

14. The method of claim 11 wherein said plural master cross links of metal are stainless steel.

15. The method of claim 14 comprising the additional step of hardening said plural stainless steel master cross links to between $R_C 55-60$.

16. The method of claim 11 wherein said master link side lock pins are leaded brass.

17. The method of claim 16 comprising the additional step of annealing said master link side lock pins to a hardness between $R_B 50-55$.

18. The method of claim 17 wherein said measured deflection force on said master link side lock pins to form said substantially molecular bond is approximately 200 lbs.

19. The method of claim 11 wherein said master link side lock pins of a metal softer than either said exposed metallic cable ends or said plural master cross links are selected from the group consisting of leaded brass, aluminum, magnesium and austenitic stainless steel.

20. A method of affixing the exposed metallic cable ends of a substantially plastic ladder chain comprising the steps of:
  inserting said exposed metallic cable ends of said substantially plastic ladder chain into cable cavities of a plural master cross links of metal having approximately the configuration of a plastic cross link member of said substantially plastic ladder chain, said cable cavities being spaced symmetrically and perpendicular to the longitudinal dimension of said plural master cross links;
  inserting master link side lock pins of a metal softer than either said exposed metallic cable ends or said plural master cross links into side pin cavities disposed in the ends thereof perpendicular to and intersecting said cable cavities against said exposed metallic cable ends; and
  deflecting said master link side lock pins with a measured deflection force, so that the ends thereof flow uniformly around and down the length of said exposed metallic cable ends causing partial compression thereof against the walls of said cable cavities thereby forming substantially molecular bond.

21. The method of claim 20 wherein said exposed metallic cable ends are stainless steel.

22. The method of claim 21 wherein said exposed stainless steel cable ends are braided.

23. The method of claim 20 wherein said plural master cross links of metal are stainless steel.

24. The method of claim 23 comprising the additional step of hardening said plural stainless steel cross lins to between $R_C 55-60$.

25. The method of claim 20 wherein said master link side lock pins are leaded brass.

26. The method of claim 25 comprising the additional step of annealing said master link side lock pins to a hardness between $R_B 50-55$.

27. The method of claim 26 wherein said measured deflection force on said master link side lock pins to form said substantially molecular bond is approximately 200 lbs.

28. The method of claim 20 wherein said master link side lock pins of a metal softer than either said exposed metallic cable ends or said plural master cross links are selected from the group consisting of leaded brass, aluminum, magnesium and austenitic stainless steel.

* * * * *